(12) United States Patent
Bonda et al.

(10) Patent No.: US 7,544,350 B2
(45) Date of Patent: *Jun. 9, 2009

(54) METHOD OF DECREASING THE UV LIGHT DEGRADATION OF POLYMERS

(75) Inventors: Craig A. Bonda, Winfield, IL (US); Stephen O'Rourke, Bolingbrook, IL (US); Anna Pavlovic, Elmwood Park, IL (US); Urvil B. Shah, Mokena, IL (US)

(73) Assignee: Hallstar Innovations Corp., Chicago, IL (US)

( * ) Notice: Subject to any disclaimer, the term of this patent is extended or adjusted under 35 U.S.C. 154(b) by 558 days.

This patent is subject to a terminal disclaimer.

(21) Appl. No.: 11/123,925

(22) Filed: May 6, 2005

(65) Prior Publication Data

US 2005/0222307 A1  Oct. 6, 2005

Related U.S. Application Data

(63) Continuation-in-part of application No. 10/385,833, filed on Mar. 11, 2003, now Pat. No. 6,962,692, which is a continuation-in-part of application No. 10/302,423, filed on Nov. 22, 2002, now Pat. No. 6,800,274.

(51) Int. Cl.
*A61K 8/18* (2006.01)
(52) U.S. Cl. .................. 424/59; 424/60; 560/81
(58) Field of Classification Search .............. None
See application file for complete search history.

(56) References Cited

U.S. PATENT DOCUMENTS

| | | | |
|---|---|---|---|
| 2,839,402 A | 6/1958 | Edwards et al. | 131/332 |
| 3,215,724 A | 11/1965 | Strobel et al. | 260/465 |
| 3,215,725 A | 11/1965 | Strobel et al. | 260/465 |
| 3,272,855 A | 9/1966 | Strobel et al. | 260/465 |
| 3,275,520 A | 9/1966 | Strobel et al. | 167/90 |
| 3,337,357 A | 8/1967 | Strobel et al. | 106/178 |
| 3,445,545 A | 5/1969 | Skoultchi | 260/881 |
| 3,461,108 A | 8/1969 | Heilman et al. | 260/78.5 |
| 3,560,455 A | 2/1971 | Hazen et al. | 526/272 |
| 3,560,456 A | 2/1971 | Hazen et al. | 526/272 |
| 3,560,457 A | 2/1971 | Hazen et al. | 526/272 |
| 3,580,893 A | 5/1971 | Heilman | 525/384 |
| 3,706,704 A | 12/1972 | Heilman | 526/208 |
| 3,729,450 A | 4/1973 | Galiano et al. | 528/500 |
| 3,729,451 A | 4/1973 | Blecke et al. | 260/78.5 |
| 3,860,700 A | 1/1975 | Viout et al. | 424/61 |
| RE28,475 E | 7/1975 | Blecke et al. | 260/78.5 |
| 3,992,356 A | 11/1976 | Jacquet et al. | 260/47 |
| 4,069,046 A | 1/1978 | Hoegl et al. | 96/1 |
| 4,107,290 A | 8/1978 | Jacquet et al. | 424/47 |
| 4,128,536 A | 12/1978 | Brodsky et al. | 427/54 |
| 4,178,303 A | 12/1979 | Lorenz et al. | 260/465 |
| 4,202,834 A | 5/1980 | Gruber et al. | 260/465 |
| 4,202,836 A | 5/1980 | Gruber et al. | 260/465.4 |
| 4,203,919 A | 5/1980 | Gruber et al. | 260/465 |
| 4,207,253 A | 6/1980 | Lorenz et al. | 260/465 |
| 4,218,392 A | 8/1980 | Lorenz et al. | 260/465 |
| 4,247,475 A | 1/1981 | Ching | 260/465 |
| 4,260,719 A | 4/1981 | Ching | 528/196 |
| 4,263,366 A | 4/1981 | Lorenz et al. | 428/332 |
| 4,264,680 A | 4/1981 | Anthony | 428/412 |
| 4,276,136 A | 6/1981 | Gruber et al. | 204/159 |
| 4,284,621 A | 8/1981 | Preuss et al. | 424/59 |
| 4,387,089 A | 6/1983 | De Polo | 424/59 |

(Continued)

FOREIGN PATENT DOCUMENTS

CA  1 164 886  4/1984

(Continued)

OTHER PUBLICATIONS

"Photostability of HallStar Photostable SPF 32 Suncreen Compared to Neutrogena UVA/UVB Sunblock SPF 30," Suncare Research Laboratories, Memphis Tennessee (Oct. 5, 2000).

(Continued)

*Primary Examiner*—Zinna N Davis
(74) *Attorney, Agent, or Firm*—Marshall, Gerstein & Borun LLP

(57) ABSTRACT

A method of decreasing the UV light degradation of a UV-light degradable polymer comprising adding to said polymer an effective amount of a compound of formula (IX):

(IX)

$$R^{17}\underset{R^{18}}{\overset{O}{\|}}C\!-\!O\!-\!R^{19}\!\left(\!O\!-\!\underset{}{\overset{O}{\|}}C\!-\!(R^{20})_t\!-\!\underset{}{\overset{O}{\|}}C\!-\!O\!-\!R^{21}\!\right)_{\!s}\!O\!-\!\underset{R^{22}}{\overset{O}{\|}}C\!-\!R^{23}$$

wherein, $R^{19}$, $R^{20}$ and $R^{21}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, and amino; $R^{17}$ and $R^{23}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, cyano, and amino; $R^{18}$ and $R^{22}$ are the same or different and are selected from the group consisting of substituted diphenylmethylene, unsubstituted diphenylmethylene, substituted 9H-fluorene, and unsubstituted 9H-fluorene; t and u are each in the range of 1 to 100; s is in the range of 0 to 100; and a, b, c, and d are each in the range of 0 to 4.

11 Claims, No Drawings

U.S. PATENT DOCUMENTS

| | | | |
|---|---|---|---|
| 4,489,057 A | 12/1984 | Welters et al. | 424/47 |
| 4,562,067 A | 12/1985 | Hopp et al. | 424/59 |
| 4,868,246 A | 9/1989 | MacLeay et al. | 525/142 |
| 5,013,777 A | 5/1991 | MacLeay et al. | 524/159 |
| 5,096,977 A | 3/1992 | MacLeay et al. | 525/343 |
| 5,210,275 A | 5/1993 | Sabatelli | 560/43 |
| 5,321,112 A | 6/1994 | Olson | 528/75 |
| 5,338,539 A | 8/1994 | Raspanti | 424/59 |
| 5,538,716 A | 7/1996 | Forestier et al. | 424/59 |
| 5,567,418 A | 10/1996 | Forestier et al. | 424/59 |
| 5,576,354 A | 11/1996 | Deflandre et al. | 514/685 |
| 5,681,871 A | 10/1997 | Molock et al. | 523/106 |
| 5,821,380 A | 10/1998 | Holderbaum et al. | 558/443 |
| 5,830,441 A | 11/1998 | Wang et al. | 424/59 |
| 5,869,099 A | 2/1999 | Keller et al. | 424/486 |
| 5,882,633 A | 3/1999 | Pisson et al. | 424/59 |
| 5,945,091 A | 8/1999 | Habeck et al. | 424/59 |
| 5,972,324 A | 10/1999 | Zofchak et al. | 424/78.03 |
| 5,993,789 A | 11/1999 | Bonda et al. | 424/59 |
| 6,001,337 A | 12/1999 | Keller et al. | 424/59 |
| 6,033,649 A | 3/2000 | Gonzenbach et al. | 424/60 |
| 6,069,258 A | 5/2000 | Habeck et al. | 549/76 |
| 6,090,374 A | 7/2000 | Habeck et al. | 424/59 |
| 6,126,925 A | 10/2000 | Bonda et al. | 424/59 |
| 6,143,850 A | 11/2000 | Keller et al. | 526/304 |
| 6,180,813 B1 | 1/2001 | Righettini | 558/400 |
| 6,224,854 B1 | 5/2001 | Robinson | 424/59 |
| 6,284,916 B1 | 9/2001 | Bonda et al. | 560/80 |
| 6,297,300 B1 | 10/2001 | Van Nuffel | 424/91 |
| 6,306,507 B1 | 10/2001 | Brunelle et al. | 428/423.7 |
| 6,358,892 B1 | 3/2002 | Harrison et al. | 508/192 |
| 6,365,311 B1 | 4/2002 | Wilson et al. | 430/108.2 |
| 6,416,773 B2 | 7/2002 | Heidenfelder et al. | 424/401 |
| 6,441,071 B1 | 8/2002 | Van Nuffel | 524/316 |
| 6,485,713 B1 | 11/2002 | Bonda et al. | 424/59 |
| 6,491,901 B2 | 12/2002 | Gers-Barlag et al. | 424/59 |
| 6,538,161 B2 | 3/2003 | Nakaya et al. | 568/424 |
| 6,544,305 B2 | 4/2003 | Wood et al. | 44/275 |
| 6,602,515 B2 | 8/2003 | Chaudhuri | 424/401 |
| 6,610,409 B2 | 8/2003 | Pickett et al. | 428/423.7 |
| 6,689,474 B2 | 2/2004 | Pickett et al. | 428/423.7 |
| 6,699,463 B2 | 3/2004 | Chaudhuri | 424/60 |
| 6,831,191 B2 | 12/2004 | Chaudhuri | 560/105 |
| 6,861,460 B2 | 3/2005 | Gorney et al. | 524/318 |
| 6,916,778 B1 | 7/2005 | Petering et al. | 510/501 |
| 6,936,735 B2 | 8/2005 | Chaudhuri | 564/156 |
| 2001/0022966 A1 | 9/2001 | Gers-Barlag et al. | 424/59 |
| 2002/0194777 A1 | 12/2002 | Wood et al. | 44/275 |
| 2003/0000130 A1 | 1/2003 | Wood et al. | 44/275 |
| 2003/0069338 A1 | 4/2003 | Goossens et al. | 524/186 |
| 2003/0072945 A1 | 4/2003 | Pickett et al. | 428/412 |
| 2003/0130390 A1 | 7/2003 | Gorny et al. | 524/307 |
| 2003/0180542 A1 | 9/2003 | Pickett et al. | 428/423.7 |
| 2004/0057912 A1 | 3/2004 | Bonda et al. | 424/59 |
| 2004/0057916 A1 | 3/2004 | Bonda et al. | 424/59 |
| 2005/0025727 A1 | 2/2005 | Lott | 424/59 |
| 2006/0083698 A1 | 4/2006 | Candau | 424/59 |
| 2006/0104924 A1 | 5/2006 | Candau | 424/59 |

FOREIGN PATENT DOCUMENTS

| | | |
|---|---|---|
| CA | 2204430 | 5/1996 |
| DE | 31 06 071 | 2/1982 |
| DE | 44 40 055 | 5/1996 |
| DE | 195 19 895 | 12/1996 |
| DE | 196 30 479 | 1/1998 |
| DE | 100 08 895 | 8/2001 |
| DE | 100 15 863 | 10/2001 |
| DE | 100 26 628 | 12/2001 |
| DE | 100 58 290 | 5/2002 |
| EP | 0 675 875 | 11/1998 |
| EP | 0 900 782 | 3/1999 |
| EP | 1 129 696 | 9/2001 |
| EP | 1 308 084 | 5/2003 |
| GB | 1129029 | 10/1968 |
| JP | 52-133959 | 11/1977 |
| JP | 52-133960 | 11/1977 |
| JP | 52-133961 | 11/1977 |
| JP | 52-133962 | 11/1977 |
| JP | 52-156843 | 12/1977 |
| JP | 53-007655 | 1/1978 |
| JP | 53-007656 | 1/1978 |
| JP | 54-005940 | 1/1979 |
| JP | 54-154532 | 12/1979 |
| JP | 56-140959 | 4/1981 |
| JP | 7-285924 | 10/1995 |
| JP | 7-325421 | 12/1995 |
| JP | 7-330637 | 12/1995 |
| JP | 7-330734 | 12/1995 |
| JP | 7-333871 | 12/1995 |
| JP | 8-050362 | 2/1996 |
| JP | 8-059520 | 3/1996 |
| JP | 8-245513 | 9/1996 |
| JP | 8-245518 | 9/1996 |
| JP | 8-248655 | 9/1996 |
| JP | 8-262759 | 10/1996 |
| JP | 9-288366 | 11/1997 |
| JP | 9-319104 | 12/1997 |
| JP | 9-319110 | 12/1997 |
| JP | 11-143095 | 5/1999 |
| JP | 2004-243596 | 9/2004 |
| WO | WO 94/14760 | 7/1994 |
| WO | WO 96/15102 | 5/1996 |
| WO | WO 00/44340 | 8/2000 |
| WO | WO 01/16224 | 3/2001 |
| WO | WO 01/57125 | 8/2001 |
| WO | WO 01/90233 | 11/2001 |
| WO | WO 01/92395 | 12/2001 |
| WO | WO 02/42368 | 5/2002 |
| WO | WO 2004/031294 | 4/2004 |
| WO | WO 2004/099150 | 11/2004 |

OTHER PUBLICATIONS

Beckwith, in "The chemistry of amides: Synthesis of amides," Zabicky, J., Ed. Interscience: New York, pp. 73-185 (1970).

Bentley et al., "Medium Effects on the Rates and Mechanisms of Solvolytic Reactions," *Adv. Phys. Org. Chem.*, vol. 14, pp. 1-67 (1977).

Bentley et al., "$Y_x$ Scales of Solvent Ionizing Power," *Progr. Phys. Org. Chem.*, vol. 17, pp. 121-158 (1990).

Bettencourt et al., "Kinetics of proton transfer from phosphonium ions to electrogenerated basis: polar, steric and structural influences on kinetic acidity and basicity" *J. Chem. Soc., Perkin Trans.* 2, pp. 515-522 (1998).

Bhattacharyya et al., "Steroselective synthesis of A/B-octahydrophenanthrene skeleton related to diterpenes via reductive alkylation in anhydrous ammonia," Tetrahedron Lett., vol. 23(40), pp. 4175-4176 (1982).

Das et al., "Stereocontrolled total synthesis of (±)-totaryl methyl ether and (±)-semperviryl methyl ether," Tetrahedron, vol. 48(41), pp. 9101-9110 (1992).

Dimroth et al., Über Pyridinium-*N*-Phenol-Betaine Und Ihre Verwendung Zur Charakterisierung Der Polarität Von Lösungsmitteln *Justus Liebigs Ann. Chem.*, vol. 661 pp. 1-37 (1963).

Diurno et al., "Reaction products of indandione with ethyl α-cyano-β-arylacrylates," Bollettino—Societa Italiana di Biologia Sperimentale, vol. 60(1), pp. 79-84 (1984).

Fainberg et al., "Correlation of Solvolysis Rates. III. t-Butyl Chloride in a Wide Range of Solvent Mixtures," *J. Am Chem. Soc.*, vol. 78 pp. 2770-2777 (1956).

Foucaud et al., "Comptes Rendus Hebdomadaires Des Seances De L'Academie Des Sciences," Compt. Rend., vol. 267(8), pp. 1538-1540 (1963).

Foucaud, "Preparation of α-methyl-α-(1-naphthyl)succinic acid," Compt. Rend., vol. 254, pp. 1301-1302 (1962).

Gerngross et al., "Synthesis of benzylideneglycine ethyl ester. Stability of the azomethine group in Schiff bases," Chem. Ber., vol. 96(10), pp. 2550-2555 (1963).

Ghosh et al., "Benzopyrans. Part 32. Reaction of some simple condensates of 4-oxo-4H-1-benzopyran-3-carboxaldehydes with diazomethane—synthesis of heterocycles linked to 3-position of [1]benzopyran," Indian Journal of Chemistry, Section B: Organic Chemistry including Medicinal Chemistry, vol. 32B(6), pp. 630-636 (1993).

Grunwald et al., "The Correlation of Solvolysis Rates," J. Am. Chem. Soc., vol. 70, pp. 846-854 (1948).

Haslem, "Recent Developments in Methods For the Esterification and Protection of the Carboxyl Group," *Tetrahedron*, vol. 36, pp. 2409-2433 (1980).

Hirata et al. "Mass spectra of α-β-substituted phenyl crotonates. II. Fragmentation of ethyl α-cyano-β-2,4-disubstituted phenyl crotonates and ethyl α-cyano-β-naphthyl crotonates," Nagoya Kogyo Daigaku Gakuho, vol. 27, pp. 169-175 (1975).

Kametani et al., "Studies on the Syntheses of Heterocyclic Compounds/ DCCXL. Studies on the Syntheses of Analgesics. XLIX. Studies on the Synthesis of 2-(6-Methoxy-2-Naphthyl) Proprionic Acid," Yakugaku Zasshi, vol. 98(2), pp. 146-152 (1978).

Kamlet et al., "An Examination of Linear Solvation Energy Relationships," *Progr. Phys. Org. Chem.*, vol. 13, pp. 485-630 (1981).

Katritzky et al., "Synthesis of 3,3'-Diarylpyrrolidines from Diaryl Ketones," Center for Heterocyclic Compounds, published online at http://www.arkat-usa.org/zark/journal/2003/GB-594J/594J.pdf, (Gainesville, FL), 5 pages (2003).

Kosower, "The Effect of Solvent on Spectra. I. A New Empirical Measure of Solvent Polarity Z-Values," *J. Am Chem. Soc.*, vol. 80, pp. 3253-3260 (1958).

Latif et al., "Carbonyl and thiocarbonyl compounds. IX. Synthesis of benzoxanthene ethers by the action of tetrahalo-o-benzoquinones," Canadian Journal of Chemistry, vol. 43(5), pp. 1246-1249 (1965).

Lehnert, Knoevenagel-Kondensationen Mit TiCl$_4$ /Base-III[1] Tetrahedron vol. 29, pp. 635-638 (1973).

McNaught et al., "IUPAC Compendium of Chemical Terminology," 2$^{nd}$ Ed. (1997).

Moal et al, "Structure and physicochemical properties of compounds with active ethylenic bonds. I. Synthesis and structure of β,β-disubstituted α-cyanoacrylic esters," Bulletin de la Societe Chimique de France, vol. 3, pp. 1033-1040 (1966).

Mustafa et al., "3,4-Benzoxanthene cyclic ethers." Receuil des Travaux Chimiques des Pays-Bas, vol. 84(11), pp. 1386-1398 (1965).

Nagai, "Stereochemistry of ethyl α-cyano-β-methyl-β-(1-naphthyl)acrylate and ethyl α-cyano-β-methyl-4-bromo-2-nitrocinnamate," Nippon Kagaku Zasshi, vol. 91(4), pp. 362-370 (1970).

Nagai, "Ultraviolet spectral studies on ethyl α-cyano-β-(1- and 2-naphyl)acrylates," Nagoya Kogyo Daigaku Gakuho, vol. 22, pp. 143-149 (1970).

Reichardt, "Solvents and Solvent Effects in Organic Chemistry," 2nd Ed., Chap. 7: Empirical Parameters of Solvent Polarity, VCH Publishers, New York, New York (1998).

Robert et al.,"Epoxides α,α-disubstituted with electron attracting groups. II. Sterochemistry and epoxidation mechanism of ethyl α-cyanoacrylates wtih sodium hypochlorite," Bulletin de la Societe Chimique de France, vol. 7, pp. 2531-2537 (1969).

Sayre et al., "Photostability Testing of Avobenzone," Allured's Cosmetics & Toiletries Magazine, vol. 114, No. 5, pp. 85-91 (May 1999).

Sheu et al., "Correlation of In vivo and In vitro Measurements of Sun Protection Factor" Journal of Feed and Drug Analysis, vol. 11, No. 2, pp. 128-132 (2003).

Tarras-Wahlberg et al., "Changes in Ultraviolet Absorption of Sunscreens After Ultraviolet Radiation," *J. Investigative Dermatology*, vol. 113, No. 4, pp. 547-553 (1999).

Turro, *Modern Molecular Photochemistry Benjamin/Cummings* Publ. Co., Menlo Park, California, pp. 296-361 (1991).

Wittig et al., "zur Umkehrbarkeit von Kondensationsrektionen in alkalischen Medium", Chemische Berichte, p. 117, lines 13-21, vol. 83 (1950).

International Search Report for International Application No. PCT/US2006/017546 dated Oct. 12, 2006 by the European Patent Office (3 pages).

Written Opinion for International Application No. PCT/US2006/017546 dated Oct. 12, 2006 by the European Patent Office (4 pages).

METHOD OF DECREASING THE UV LIGHT DEGRADATION OF POLYMERS

CROSS-REFERENCE TO RELATED APPLICATIONS

This is a continuation-in-part of U.S. patent application Ser. No. 10/385,833 filed Mar. 11, 2003 which is a continuation-in-part of U.S. application Ser. No. 10/302,423 filed Nov. 22, 2002, now U.S. Pat. No. 6,800,274.

BACKGROUND OF THE INVENTION

Field of the Invention

The invention relates to methods to increase the photostability of a polymer, particularly PVC films. More particularly, the polymer is combined with an effective amount of one or more compounds of formula (IX):

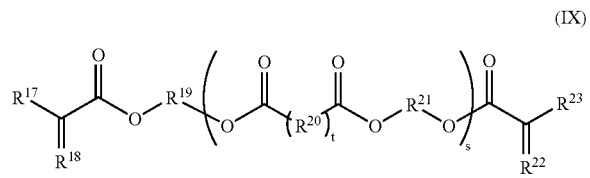

wherein, $R^{19}$, $R^{20}$ and $R^{21}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, and amino; $R^{17}$ and $R^{23}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, cyano, and amino; $R^{18}$ and $R^{22}$ are the same or different and are selected from the group consisting of substituted diphenylmethylene, unsubstituted diphenylmethylene, substituted 9H-fluorene, and unsubstituted 9H-fluorene; t and u are each in the range of 1 to 100; s is in the range of 0 to 100; and a, b, c, and d are each in the range of 0 to 4.

BRIEF DESCRIPTION OF RELATED TECHNOLOGY

My U.S. Pat. No. 6,800,274 describes compounds effective to increase the photostability of a dibenzoylmethane derivative compound in a sunscreen composition. Surprisingly, it has been found that these same compounds also decrease the photodegradation of polymers, unexpectedly decreasing the coloration, e.g., yellowing of clear polymer films and coatings, e.g., PVC films and coatings.

SUMMARY

The present invention is directed to the addition of one or more compounds of formula (IX) to a polymer during processing of the polymer into a structure, e.g., a polymeric sheet or film, or molded part, particularly a clear sheet, film or coating, such as PVC, to decrease polymer photodegradation, indicated by the coloration, e.g., yellowing, of the polymer.

One aspect of the invention is to decrease the photodegradation of a polymer by the addition thereto of an effective amount, e.g., 0.05% to 25%, based on the weight of the polymer, preferably 0.1 to 10%, of a compound of Formula (IX).

Another aspect of the invention is a method for photostabilizing a polymer that does not include a UV light-photodegradable photoactive compound, such as a dibenzoylmethane derivative, by the addition of compound of formula (IX).

Still another aspect of the invention is a method for photostabilizing a polymer composition that does not include a photodegradable UV-absorbing compound, particularly 4-(1,1-dimethylethyl)-4'-methoxydibenzoylmethane (PARSOL® 1789), by the addition thereto of a compound of formula (IX).

DEFINITIONS

The term "alkyl" as used herein refers to straight- and branched-chain hydrocarbon groups, preferably containing one to thirty carbon atoms. Examples of alkyl groups are $C_1$-$C_4$ alkyl groups. As used herein the designation $C_x$-$C_y$, wherein x and y are integers, denotes a group having from x to y carbon atoms, e.g., a $C_1$-$C_4$ alkyl group is an alkyl group having one to four carbon atoms. Nonlimiting examples of alkyl groups include, methyl, ethyl, n-propyl, isopropyl, n-butyl, sec-butyl (2-methylpropyl), and t-butyl (1,1-dimethylethyl).

The term "cycloalkyl" as used herein refers to an aliphatic cyclic hydrocarbon group, preferably containing three to eight carbon atoms. Nonlimiting examples of cycloalkyl groups include cyclopropyl, cyclobutyl, cyclopentyl, and cyclohexyl.

The terms "substituted alkyl" and "substituted cycloalkyl" as used herein refer to an alkyl or cycloalkyl groups having one or more substituents. The substituents can include, but are not limited to, cycloalkyl, aryl, heteroaryl, heterocycloalkyl, substituted aryl, substituted heteroaryl, and substituted heterocycloalkyl. The preferred substituted alkyl groups have one to twenty carbon atoms, not including carbon atoms of the substituent group. Preferably, a substituted alkyl group is mono- or di-substituted at one, two, or three carbon atoms. The substituents can be bound to the same carbon or different carbon atoms.

The term "ester" as used herein refers to a group of the general formula:

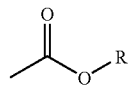

wherein R is an alkyl group, cycloalkyl group, substituted alkyl group, or a substituted cycloalkyl group.

The term "aryl" as used herein refers to monocyclic, fused bicyclic, and fused tricyclic carbocyclic aromatic ring systems including, but not limited to, phenyl, naphthyl, tetrahydronaphthyl, phenanthrenyl, biphenylenyl, indanyl, indenyl, anthracenyl, and fluorenyl.

The term "heteroaryl" as used herein refers to monocyclic, fused bicyclic, and fused tricyclic aromatic ring systems, wherein one to four-ring atoms are selected from the group consisting of oxygen, nitrogen, and sulfur, and the remaining ring atoms are carbon, said ring system being joined to the remainder of the molecule by any of the ring atoms. Nonlimiting examples of heteroaryl groups include, but are not limited to, pyridyl, pyrazinyl, pyrimidinyl, pyrrolyl, pyrazolyl, imidazolyl, thiazolyl, tetrazolyl, oxazolyl, isooxazolyl, thiadiazolyl, oxadiazolyl, thiophenyl, furanyl, quinolinyl, isoquinolinyl, benzoxazolyl, benzimidazolyl, and benzothiazolyl.

The term "heterocycloalkyl" as used herein refers to an aliphatic, partially unsaturated or fully saturated, 3- to 14-membered ring system, including single rings of 3 to 8 atoms and bi- and tricyclic ring systems. The heterocycloalkyl ring-systems include one to four heteroatoms independently selected from oxygen, nitrogen, and sulfur, wherein a nitrogen and sulfur heteroatom optionally can be oxidized and a nitrogen heteroatom optionally can be substituted. Representative heterocycloalkyl groups include, but are not limited to, pyrrolidinyl, pyrazolinyl, pyrazolidinyl, imidazolinyl, imidazolidinyl, piperidinyl, piperazinyl, oxazolidinyl, isoxazolidinyl, morpholinyl, thiazolidinyl, isothiazolidinyl, and tetrahydrofuryl.

The terms "substituted aryl," "substituted heteroaryl," and "substituted heterocycloalkyl" as used herein refer to an aryl, heteroaryl, or heterocycloalkyl group substituted by a replacement of one, two, or three of the hydrogen atoms thereon with a substitute selected from the group consisting of halo, OR, N(R)$_2$, C(=O)N(R)$_2$, CN, alkyl, substituted alkyl, aryl, substituted aryl, heteroaryl, substituted heteroaryl, cycloalkyl, substituted cycloalkyl, heterocycloalkyl, substituted heterocycloalkyl, O(CH$_2$)$_{1-3}$N(R)$_2$, O(CH$_2$)$_{1-3}$CO$_2$H, and trifluoromethyl.

The term "amino" as used herein refers an —NH$_2$ or —NH— group, wherein each hydrogen in each formula can be replaced with an alkyl, cycloalkyl, aryl, heteroaryl, heterocycloalkyl, substituted alkyl, substituted cycloalkyl, substituted aryl, substituted heteroaryl, or substituted heterocycloalkyl group, i.e., N(R)$_2$. In the case of —NH$_2$, the hydrogen atoms also can be replaced with substituents taken together to form a 5- or 6-membered aromatic or non-aromatic ring, wherein one or two carbons of the ring optionally are replaced with a heteroatom selected from the group consisting of sulfur, oxygen, and nitrogen. The ring also optionally can be substituted with an alkyl group. Examples of rings formed by substituents taken together with the nitrogen atom include morpholinyl, phenylpiperazinyl, imidazolyl, pyrrolidinyl, (N-methyl)piperazinyl, and piperidinyl.

The term "cyano" as used herein refers to a —C≡N group, also designated —CN.

The term "substituted diphenylmethylene" as used herein refers to a compound of the general formula:

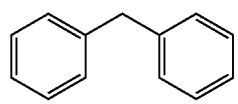

wherein the compound is substituted by a replacement of one, two, or three of the hydrogen atoms resident on each aromatic ring with a substitute selected from the group consisting of halo, OR, N(R)$_2$, C(=O)N(R)$_2$, CN, alkyl, substituted alkyl, aryl, substituted aryl, heteroaryl, substituted heteroaryl, cycloalkyl, substituted cycloalkyl, heterocycloalkyl, substituted heterocycloalkyl, O(CH$_2$)$_{1-3}$N(R)$_2$, O(CH$_2$)$_{1-3}$CO$_2$H, and trifluoromethyl.

As described herein, a polymer is surprisingly photostabilized by incorporating into the polymer a compound of formula (IX):

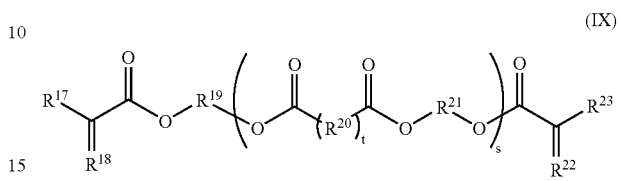

(IX)

wherein, $R^{19}$, $R^{20}$ and $R^{21}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, and amino; $R^{17}$ and $R^{23}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, cyano, and amino; $R^{18}$ and $R^{22}$ are the same or different and are selected from the group consisting of substituted diphenylmethylene, unsubstituted diphenylmethylene, substituted 9H-fluorene, and unsubstituted 9H-fluorene; t and u are each in the range of 1 to 100; s is in the range of 0 to 100; and a, b, c, and d are each in the range of 0 to 4. Compounds of formula (IX) are able to photostabilize any photodegradable polymer.

Examples of photodegradable polymers that are photostabilized by the addition of, for example, 0.05% to 25%, preferably 0.1-10% by weight of compounds of formula (IX) include: acetals; acrylics; acrylonitrile-butadiene-styrene (ABS); alkyds; cellulosics; coumarone-indene; diallyl phthalate (DAP); epoxy; fluoropolymer; melamine-formaldehyde; nitrile resins; nylon; petroleum resins; phenolic; polyamide-imide; polyarylates; polybutylene; polycarbonate; polyethylene; polyimides; polyketones; polyphenylene oxide, modified; polyphenylene sulfide; polypropylene; polystyrene; polyurethanes; polyvinyl acetate (PCAc) and other vinyls; polyvinyl chloride; styrene acrylonitrile; styrene butadiene latexes and other styrene copolymers; sulfone polymers; thermoplastic polyester (saturated); unsaturated polyester; and urea-formaldehyde. The preferred polymer is a polyvinyl chloride (PVC) film.

It is preferred that one or more compounds of formula (IX) is present in the polymer composition in a range of about 0.05% to about 25% by weight of the total weight of the polymer, more preferably about 0.1% to about 10%.

EXAMPLES

The following two PVC films were prepared, film 1 including a POLYCRYLENE® compound ($C_{70}H_{84}N_2O_{16}$), hexanedioic acid, polymer with 2,2-dimethyl-1,3-propanediol, bis(2-cyano-3,3-diphenyl-2-propenoate), having the following structure:

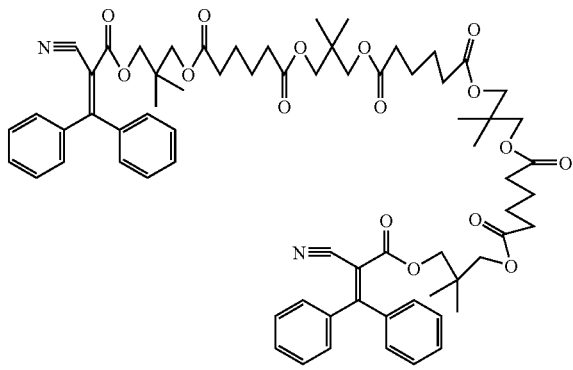

and film 2 including a prior art, Tinovin 328 light stabilizing plasticizer. The two films were otherwise each formed exactly alike at 20 mm thick, and had the following compositions:

| Recipe JE34-255 | Film 1 | Film 2 (control) | Material | Supplier |
| --- | --- | --- | --- | --- |
| | | Recipe for a 200 mm thick clear and flexible PVC film | | |
| OV 240F Resin | 100.00 | 100.00 | OXYVINYLS ™ PVC Homopolymer Resin | Oxy Vinyls, LP. |
| Therm Chek SP0350 | 2.00 | 2.00 | Ba/Zn Heat Stabilizer | Ferro Corp. |
| Paraplex G62 | 5.00 | 5.00 | Epoxidized Soybean Oil | The C.P. Hall Company |
| Paraplex G59 | 67.00 | 67.00 | Polyester Adipate Plasticizer | The C.P. Hall Company |
| RX-13938 (Polycrylene) | 1.80 | | Polyester Light Stabilizing Plasticizer | Ester Solutions Company |
| Tinuvin 328 | | 0.50 | Benzotriazole Light Stabilizer | CIBA Specialty Chemicals Corp. |
| Total | 175.80 | 174.50 | | |

The two films were subjected to a standard QUV accelerated aging test, an advanced polymer degradation test, by subjecting the films to alternating 8 hours of high humidity, 8 hours of heat (60° C.) and 8 hours of UV light (280-400 nm). The results after three weeks were as follows, based on two readings for each film:

| APHA Color Change after | Film 1 | Control |
| --- | --- | --- |
| 1 week aging | 32/31 | 32/31 |
| visual | dry/exc | dry/exc |
| 2 week aging | 33/32 | 33/32 |
| visual | dry/exc | dry/exc |
| 3 week aging | 59/56 | 74/75 |
| visual | dry/exc | dry/exc |

Unexpectedly, the claimed polymer resulted in a color change of about 26 after three weeks (an average of 31.5 after 1 week to an average of 57.5 after 3 weeks), whereas the prior art light stabilizer-containing composition had a color change from an average of 31.5 after 1 week to an average of 74.5 after 3 weeks, or a color change of 43, indicating about 60% less polymer degradation of film 1 that incorporated the claimed compound vs. the prior art light stabilizer.

The foregoing description is given for clearness of understanding only, and no unnecessary limitations should be understood therefrom, as modifications within the scope of the invention may be apparent to those having ordinary skill in the art.

What is claimed is:

1. A method of decreasing the UV light degradation of a UV-light degradable polymer comprising adding to said polymer an effective amount of a compound of formula (IX):

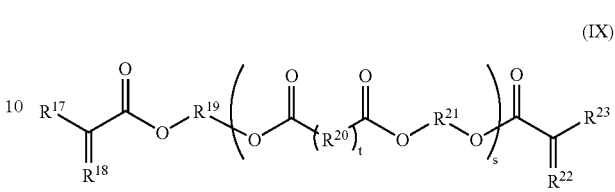

wherein, $R^{19}$, $R^{20}$ and $R^{21}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, and amino; $R^{17}$ and $R^{23}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, cyano, and amino; $R^{18}$ and $R^{22}$ are the same or different and are selected from the group consisting of substituted diphenylmethylene, unsubstituted diphenylmethylene, substituted 9H-fluorene, and unsubstituted 9H-fluorene; t and u are each in the range of 1 to 100; s is in the range of 0 to 100; and a, b, c, and d are each in the range of 0 to 4.

2. The method of claim 1, wherein $R^{19}$, $R^{20}$ and $R^{21}$ are selected from the group consisting of $C_1$-$C_{15}$ branched chain alkyl.

3. The method of claim 1, wherein $R^{17}$ and $R^{23}$ are the same and are cyano.

4. The method of claim 1, wherein said compound of formula (IX) is present in a range of about 0.05% to about 25% by weight of the total weight of the composition.

5. The method of claim 4, wherein said compound of formula (IX) is present in a range of about 0.1% to about 10% by weight of the total weight of the composition.

6. The method of claim 1, wherein the effective amount of the compound of formula (IX) is in the range of 0.05% to 25%, based on the total weight of UV light-degradable polymer.

7. The method of claim 1, wherein the UV light-degradable polymer is PVC.

8. The method of claim 7, wherein the PVC is in the form of a film.

9. A composition that does not include a dibenzoylmethane compound, comprising a UV light-degradable polymer and 0.05% to 25%, based on the total weight of UV light-degradable polymer, of a compound of formula (IX):

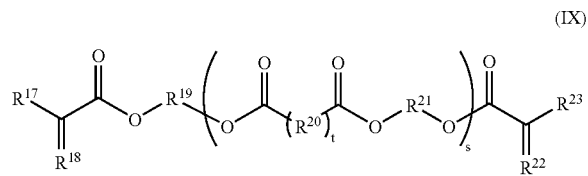

wherein, $R^{19}$, $R^{20}$ and $R^{21}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, and amino; $R^{17}$ and $R^{23}$ are the same or different and are selected from the group consisting of $C_1$-$C_{30}$ alkyl, $C_3$-$C_8$ cycloalkyl, substituted alkyl, substituted cycloalkyl, ester, aryl, heteroaryl, heterocycloalkyl, substituted aryl, substituted heteroaryl, substituted heterocycloalkyl, cyano, and amino; $R^{18}$ and $R^{22}$ are the same or different and are selected from the group consisting of substituted diphenylmethylene, unsubstituted diphenylmethylene, substituted 9H-fluorene, and unsubstituted 9H-fluorene; t and u are each in the range of 1 to 100; s is in the range of 0 to 100; and a, b, c, and d are each in the range of 0 to 4.

10. The composition of claim 9, wherein $R^{19}$, $R^{20}$ and $R^{21}$ are selected from the group consisting of $C_1$-$C_{15}$ branched chain alkyl.

11. The composition of claim 9, wherein $R^{17}$ and $R^{23}$ are the same and are cyano.

* * * * *